United States Patent
Fuentes Utrilla et al.

(10) Patent No.: US 9,845,739 B2
(45) Date of Patent: Dec. 19, 2017

(54) SYSTEMS AND METHODS FOR AUTOMATICALLY CONTROLLING THE ENGINE OF A TURF-CARE VEHICLE

(71) Applicant: Textron, Inc., Providence, RI (US)

(72) Inventors: Diego Fuentes Utrilla, Ipswich (GB); Joseph Lowell Harper, Waxhaw, NC (US); Gayatri A. Deshpande, Charlotte, NC (US)

(73) Assignee: Textron Innovations Inc., Providence, RI (US)

( * ) Notice: Subject to any disclaimer, the term of this patent is extended or adjusted under 35 U.S.C. 154(b) by 166 days.

(21) Appl. No.: 14/972,921

(22) Filed: Dec. 17, 2015

(65) Prior Publication Data

US 2016/0177844 A1 Jun. 23, 2016

Related U.S. Application Data

(60) Provisional application No. 62/093,103, filed on Dec. 17, 2014.

(51) Int. Cl.
  *G06F 19/00* (2011.01)
  *F02D 31/00* (2006.01)
  (Continued)

(52) U.S. Cl.
  CPC ............ *F02D 31/001* (2013.01); *A01B 45/00* (2013.01); *A01B 67/00* (2013.01); *A01D 34/006* (2013.01);
  (Continued)

(58) Field of Classification Search
  CPC ......... B60W 10/06; B60W 2510/0638; B60W 2510/0647; F02D 31/00; F02D 2200/1012; F02D 31/001
  (Continued)

(56) References Cited

U.S. PATENT DOCUMENTS

| | | | |
|---|---|---|---|
| 4,727,710 A | 3/1988 | Kuhn | |
| 4,905,544 A * | 3/1990 | Ganoung | B60W 30/18 477/109 |
| 5,445,128 A * | 8/1995 | Letang | B60K 31/045 123/436 |
| 5,847,644 A * | 12/1998 | Weisman, II | B60K 31/045 340/439 |
| 6,067,489 A * | 5/2000 | Letang | F01P 7/04 123/299 |
| 7,669,580 B2 | 3/2010 | Silbernagel et al. | |
| 2004/0242091 A1* | 12/2004 | Okuyama | B63H 21/21 440/86 |

(Continued)

FOREIGN PATENT DOCUMENTS

DE  102007003956 A1  11/2007
EP  1472927 A2  11/2004

(Continued)

OTHER PUBLICATIONS

PCT Search Report, PCT/US/2015/066364, dated Apr. 8, 2016.

*Primary Examiner* — John Kwon
(74) *Attorney, Agent, or Firm* — Polster Lieder

(57) ABSTRACT

A system and method for automatically controlling an engine of a turf-care vehicle. The method comprises receiving, at an engine speed control module, a mode selection input from an engine speed control mode selection device. The mode selection input is indicative of one a plurality of engine speed control modes, and all of the engine speed control modes are implementable by the engine speed control module. The method additionally comprises monitoring, via the engine speed control module, an operating status of one or more vehicle systems and/or one or more vehicle sensors. The method further comprises automatically controlling, via the engine speed control module, a rotational speed of the engine based at least in part on the selected engine speed control mode and the operating status of the one or more vehicle systems and/or one or more vehicle sensors.

12 Claims, 8 Drawing Sheets

(51) Int. Cl.
  *A01D 34/00*  (2006.01)
  *F02D 41/04*  (2006.01)
  *F02D 41/08*  (2006.01)
  *F02D 41/26*  (2006.01)
  *A01B 45/00*  (2006.01)
  *A01B 67/00*  (2006.01)
  *A01D 101/00*  (2006.01)

(52) U.S. Cl.
  CPC ........... *F02D 41/045* (2013.01); *F02D 41/08* (2013.01); *F02D 41/26* (2013.01); *A01D 2101/00* (2013.01); *B60W 2300/156* (2013.01)

(58) Field of Classification Search
  USPC ........ 701/101, 102, 110, 116; 123/319, 323, 123/330, 336, 337
  See application file for complete search history.

(56) References Cited

U.S. PATENT DOCUMENTS

| | | | |
|---|---|---|---|
| 2005/0245351 A1* | 11/2005 | Yamada | ................ B60W 10/06 477/110 |
| 2006/0021312 A1 | 2/2006 | Brandon et al. | |
| 2010/0121539 A1 | 5/2010 | Price et al. | |
| 2013/0289832 A1 | 10/2013 | Pirotais | |

FOREIGN PATENT DOCUMENTS

| | | |
|---|---|---|
| EP | 2193968 A2 | 6/2010 |
| JP | 2006082770 A | 3/2006 |
| WO | 2004085752 A1 | 10/2004 |

* cited by examiner

SYSTEMS AND METHODS FOR AUTOMATICALLY CONTROLLING THE ENGINE OF A TURF-CARE VEHICLE

CROSS-REFERENCE TO RELATED APPLICATIONS

This application claims the benefit of U.S. Provisional Application No. 62/093,103, filed on Dec. 17, 2014. The disclosure of the above application is incorporated herein by reference in its entirety.

FIELD

The present teachings relate to electronic control systems and methods for controlling the speed of an engine of a turf-care vehicle.

BACKGROUND

The statements in this section merely provide background information related to the present disclosure and may not constitute prior art.

Commercial turf-care vehicles typically used for cutting, grooming and maintaining grass at golf courses, sporting venues, parks, etc., often include an internal combustion engine (ICE) operable to provide motive force to the vehicle. The operating speed of the ICE for such turf-care vehicles is typically controlled by an operator of the vehicle using a throttle control such as a foot operated pedal or hand operated lever. Hence, if the operator wishes to increase or decrease the speed at which the ICE is operating, i.e., the revolutions per minute (RPMs) of a crankshaft of the ICE, the operator utilizes the throttle control to command the ICE to increase or decrease RPMs.

Often when operating such turf-care vehicles, the operator will command the ICE to increase or decrease speed more than or less than what is actually needed for the turf-care vehicle to execute the particular function being performed, and/or the operator will command an increase or decrease in ICE speed for a longer or shorter time period than what is actually needed to execute the particular function being performed. Such imprecise control of ICE speed can result in inefficient fuel consumption, additional wear-and-tear on the ICE, and additional wear-and-tear on other components and systems of the turf-care vehicle.

SUMMARY

The present disclosure provides systems and methods for automatically controlling an engine of a turf-care vehicle. In various embodiments a method comprises receiving, at an engine speed control module, a mode selection input from an engine speed control mode selection device. The mode selection input is indicative of one of a plurality of engine speed control modes, and all of the engine speed control modes are implementable by the engine speed control module. The method additionally comprises monitoring, via the engine speed control module, an operating status of one or more vehicle systems and/or one or more vehicle sensors. The method further comprises automatically controlling, via the engine speed control module, a rotational speed of the engine based on the selected engine speed control mode and the operating status of the one or more vehicle systems and/or one or more vehicle sensors.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
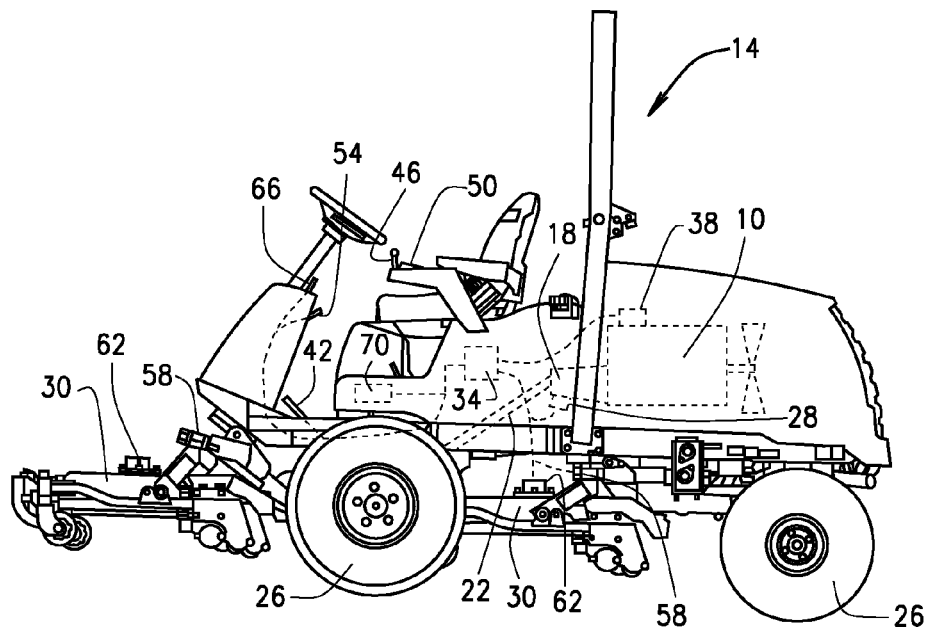
FIG. 1 is an exemplary illustration of a turf-care vehicle including an electronic engine speed control module, in accordance with various embodiments of the present disclosure.

The following description is merely exemplary in nature and is in no way intended to limit the present teachings, application, or uses. Throughout this specification, like reference numerals will be used to refer to like elements.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, device, object, etc., is referred to as being "on," "engaged to or with," "connected to or with," or "coupled to or with" another element, device, object, etc., it can be directly on, engaged, connected or coupled to or with the other element, device, object, etc., or intervening elements, devices, objects, etc., can be present. In contrast, when an element is referred to as being "directly on," "directly engaged to," "directly connected to," or "directly coupled to" another element, device, object, etc., there may be no intervening elements, devices, objects, etc., present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

The term code, as used here, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories. Additionally, the computer programs include processor executable instructions that are stored on a non-transitory tangible computer readable medium. The computer programs may also include stored data. Non-limiting examples of the non-transitory tangible computer readable medium are nonvolatile memory, magnetic storage, and optical storage. Furthermore, as used herein, the term module can refer to, be part of, or include an application specific integrated circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module can include memory (shared, dedicated, or group) that stores code executed by the processor.

Referring to FIG. 1, the present disclosure provides various systems and methods for electronically controlling the speed of an internal combustion engine (ICE) 10 of a turf-care vehicle 14 based on various inputs from various systems and sensors of the vehicle 14. In addition to the ICE 10, the vehicle 14 includes a transmission 18 operatively connected to the ICE 10, a drive shaft 22 operatively connected at a first end to the transmission 18 and operatively connected at an opposing second end to a rear axle and differential assembly (not shown) that is connected to one or more wheels 26. Generally, the ICE 10 operates to rotate a crank shaft (not shown and internal to the ICE 10) that is operatively connected to the transmission 18. The rotational speed of the crank shaft is referred to herein as the operational speed of the ICE 10 or engine speed. Hence, the ICE 10 delivers rotational force to the transmission 18, which converts the rotational force to torque output to the drive shaft 22. The transmission 18 is controlled by an electrical displacement control (EDC) module 28 that controls the amount of torque (e.g., torque values) output by the transmission, thereby controlling the terrestrial speed of the vehicle 14, i.e., the speed at which the vehicle 14 is moving forward or backward across a ground surface. The torque output by the transmission 18 is delivered to one or more of the wheels 26, via the drive shaft 22 and/or the rear axle and differential assembly, or any other suitable drive line, e.g., hydraulic motor implemented drive line, to rotate the wheels 26 and provide motive force to the vehicle 14. In various embodiments, the rotational force generated by the ICE 10 can be additionally utilized to operate various other systems or assemblies of the vehicle, for example a hydraulic pump (not shown) operable to provide hydraulic force utilized to operate one or more grass cutting unit(s) 30 of the vehicle 14. Although the cutting unit(s) 30 are exemplarily illustrated as rotary cutting units, the cutting unit(s) 30 can be cylindrical reel cutting unit and remain within the scope of the present disclosure.

Importantly, the vehicle 14 further includes an engine speed control module (ESCM) 34 that is bi-directionally communicatively connected (wired or wirelessly) to an engine control unit (ECU) 38 for controlling the operational speed of the ICE 10. The ESCM 34 is also bi-directionally communicatively connected to various systems, sensors and electronic controllers, simply referred to herein as various vehicle components. For example, in various embodiments, the ESCM 34 can be bi-directionally communicatively connected (wired or wirelessly) to one or more of a foot operated accelerator pedal 42, a hand operated throttle control mechanism 46, an operator interface 50 (e.g., a liquid-crystal display unit, a panel or box having a display plus a plurality of buttons and/or switches, a touch-screen display unit, double-cycling of a vehicle operation key or switch such as an Forward/Neutral/Reverse key or a tow mode switch or a light switch, or any other suitable hardware or software switching device, etc.), a power take off (PTO) switch 54, a cutting unit position sensor 58, a cutting unit load/pressure sensor 62, a transport/mower switch 66, and a vehicle main controller 70. In various embodiments, the ESCM 34 is discrete and separate from the main controller 66. Alternatively, in various embodiments, the ESCM 34 can be included in the main controller 66. It is envisioned that the throttle control mechanism 46 can be any suitable variable control mechanism or devices such as lever, a rocker switch, a knob controlled potentiometer, or any other suitable variable control mechanism.

In various embodiments, the ESCM 34 is structured and operable to execute one or more engine speed command programs or algorithms (simply referred to herein as engine speed command software) and output engine speed commands to the ECU 38 for controlling the operational speed of the ICE 10. In such implementations, the engine speed command software comprises processor-executable instructions and other data that are stored on one or more non-transitory tangible computer readable medium(s). Non-limiting examples of the non-transitory tangible computer readable mediums that can be used alone or in any combination include various forms of nonvolatile memory, flash memory, magnetic storage, and optical storage.

Alternatively, in various other embodiments, it is envisioned that the ESCM 34 can be a hardware based module that is structured and operable to implement the engine speed command software functionality as described herein. For example, it is envisioned that the ESCM 34 can comprise one or more, or be part of, application specific integrated circuit(s) (e.g., ASIC(s)), combinational logic circuit(s); field programmable gate array(s) (FPGA); processor(s) (shared, dedicated, or group) that execute software code; and/or other suitable hardware components that provide the functionality described herein; or a combination of some or all of the above, such as in a system-on-chip, and remain within the scope of the present disclosure.

Furthermore, it should be understood that, although the various engine speed control operations and functionality are often described herein as being implemented or carried out by ESCM 34, it will be appreciated that in some embodiments the ESCM 34 may indirectly perform and/or control performance of such operations and functionality by generating commands and control signals that can cause other elements to carry out the control operations and functionality described herein. For example, in the various executable software embodiments, it is the execution of the engine speed command software by one or more processors of the ESCM 34 that can generate the engine speed commands that are then output by the ESCM 34 to control the engine speed operations and functions as described herein. Or, in the various hardware embodiments, it is the operation of the various ESCM 34 hardware components that can generate the engine speed commands that are then output by the ESCM 34 to control the engine speed operations and functions as described herein.

The engine speed command software can be selectively instructed by an operator of the vehicle 14 to enter one of various engine speed control modes, then based on the respective engine speed control mode and inputs from the various systems, sensors and/or electronic controllers of the vehicle 14, output engine speed commands to the ECU 38 to actively control the operational speed of the ICE 10. More specifically, the ESCM 34 is structured and operable to communicate with the various systems, sensors and/or controllers of the vehicle 14 to monitor the operations of, and receive inputs from, such systems, sensors and/or controllers. Then, the ESCM 34 analyzes the system/sensor/controller inputs in accordance with the particular selected engine speed control mode of the engine speed command software, and outputs speed commands to the ECU 38 to actively control the operational speed of the ICE 10.

The engine speed control mode selection can be implemented using any suitable engine speed control mode selection means, device or method. For example, any of the engine speed control modes described herein can be selected using the operator interface 50, such as a panel or box of buttons and/or switches, a liquid-crystal touch screen display unit, a touch-screen display unit, double-cycling of a vehicle operation key or switch such as an Forward/Neutral/Reverse key or a tow mode switch or a light switch, or any other suitable hardware or software switching device capable of inputting to the ESCM 34 a command or signal indicative of a desired engine speed control mode.

Figure 2A:
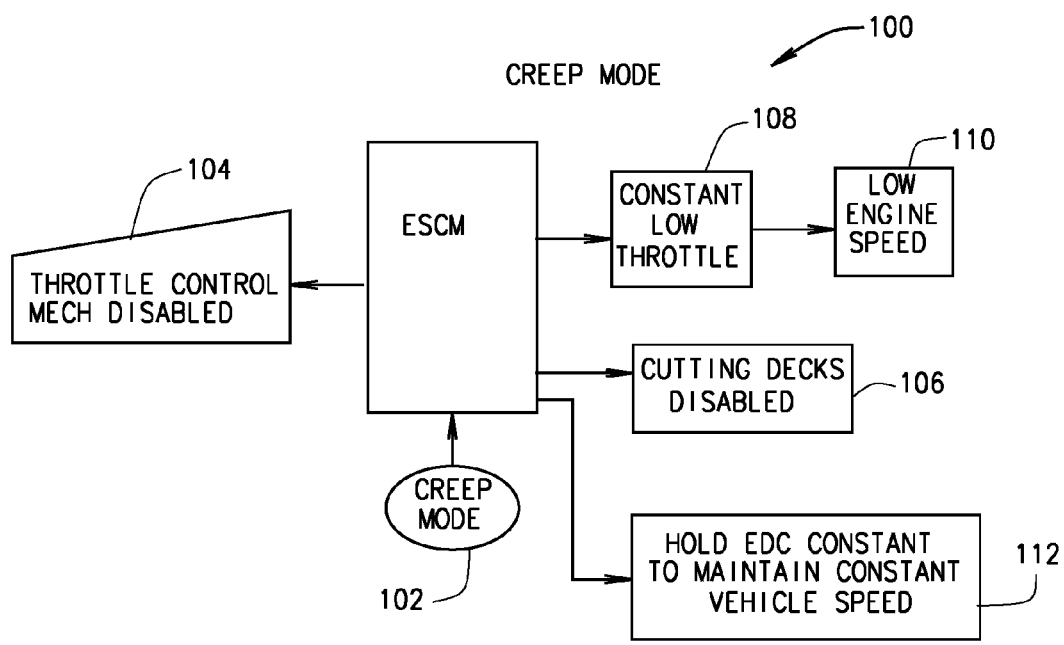
FIG. 2A is a flow chart illustrating a Creep Mode functionality of the electronic engine speed control module, shown in FIG. 1, in accordance with various embodiments of the present disclosure.
Figure 2B:
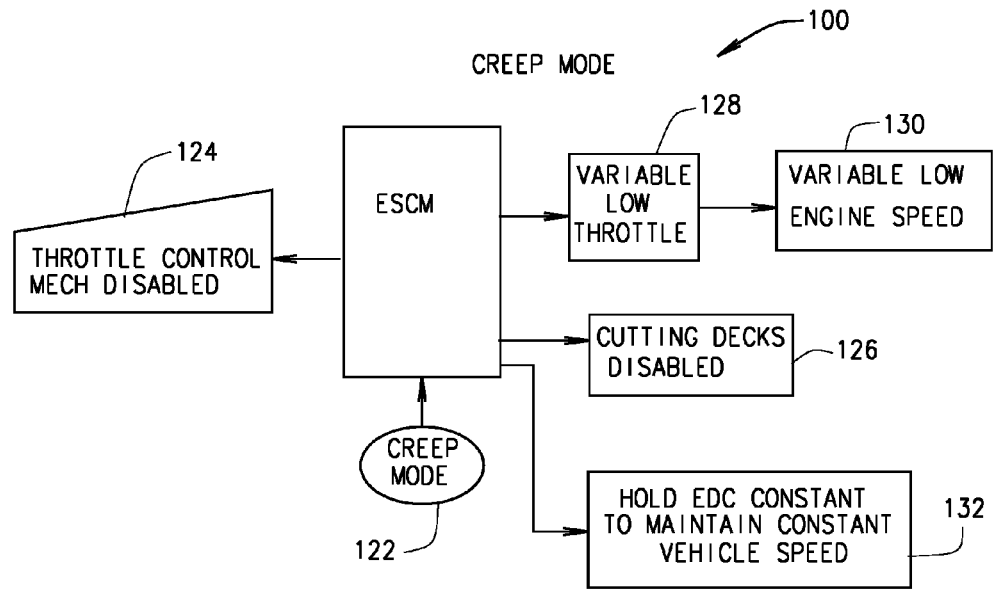
FIG. 2B is a flow chart illustrating the Creep Mode functionality in accordance with various other embodiments of the present disclosure.

Referring now to FIGS. 2A and 2B, in various embodiments, wherein the vehicle 14 includes the throttle control mechanism 46, the engine speed command software can include a Creep Mode, e.g., a software routine 100 of the engine speed command software for implementing the Creep Mode operational engine speed control parameters. When the ESCM 34 receives a mode selection input from the engine speed control mode selection device indicating the Creep Mode has been selected, the ESCM 34 will command the ECU 38 to limit the engine speed such that the terrestrial speed of the vehicle 14 will not exceed a predetermined speed, e.g., 5 KPH (kilometers per hour), or approximately 3.1 MPH (miles per hour), regardless of whether the transport/mower switch 66 is set to transport mode or mower mode. More particularly, when in the Creep Mode, the ESCM 34 will set an engine speed creep mode threshold to a particular value, e.g., 20%-30% of a predetermined maximum engine speed (e.g., 3000 RPMs). Hence, when in Creep Mode the operational speed of the ICE 10 will not be allowed to exceed the creep mode threshold, thereby controlling the terrestrial speed of the vehicle 14 such that the terrestrial speed will not exceed a predetermined speed, e.g., 5 KPH. The Creep Mode is suitable for operation of the vehicle 14 within a garage, parking facility or other confined area. In some embodiments, when in the Creep Mode the ESCM 34 will disable the cutting unit(s) 30 to render the respective grass cutting blades inoperable.

For example, in various embodiments of the Creep Mode, as exemplarily illustrated in FIG. 2A, if Creep Mode is selected, as indicated at 102, the ESCM 34 disables the throttle control mechanism 46 and the cutting unit deck(s) 30, as indicated at 104 and 106. Additionally, the ESCM 34 will output command signals to the ECU 38 to set and maintain the engine throttle such that the ICE 10 will be operated at a substantially constant low speed, e.g., 600 to 800 revolutions per minute (RPMs), as indicated at 108 and 110. Still further, the ESCM 34 will command the EDC 28 to maintain a substantially constant low terrestrial speed of the vehicle 14, e.g., 5 KPH, as indicated at 112.

Alternatively, in various other embodiments of the Creep Mode, as exemplarily illustrated in FIG. 2B, if Creep Mode is selected, as indicated at 122, the ESCM 34 receives a variable low throttle input from the throttle control mechanism 46, as indicated at 124, and disables the cutting unit heads 30, as indicated at 126. The ESCM 34 will output command signals to the ECU 38 to set and maintain the engine throttle such that the ICE 10 will be operated at a variable low speed corresponding to the position of the throttle control mechanism 46, as indicated at 128 and 130. However, regardless of the engine speed, the ESCM 34 will command the EDC 28 to maintain a substantially constant low terrestrial speed of the vehicle 14, e.g., 5 KPH, as indicated at 132.

Figure 3:
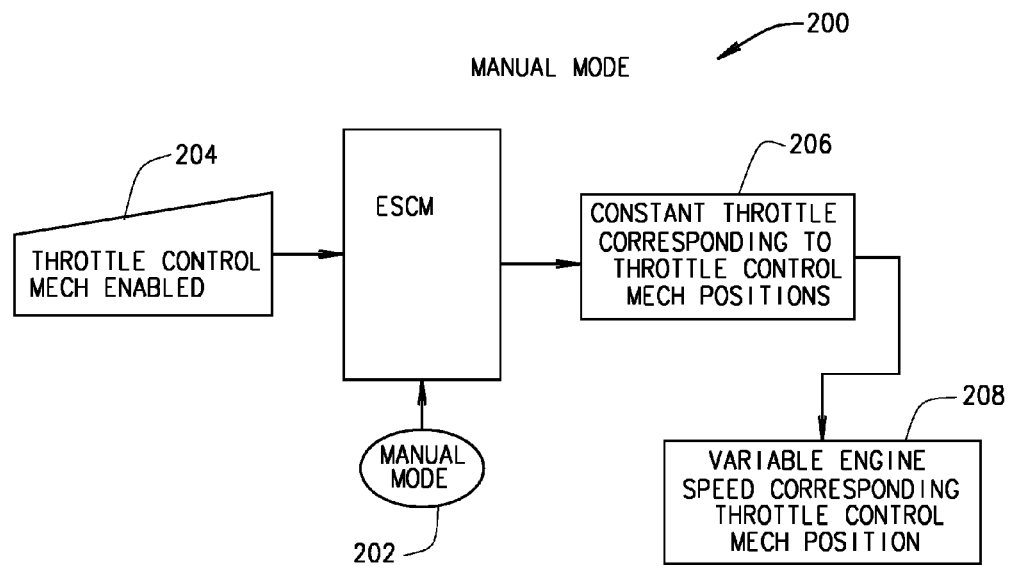
FIG. 3 is a flow chart illustrating a Manual Mode functionality of the electronic engine speed control module, shown in FIG. 1, in accordance with various embodiments of the present disclosure.

Referring now to FIG. 3, in various embodiments, wherein the vehicle 14 includes the throttle control mechanism 46, the engine speed command software can include a Manual Mode, e.g., a software routine 200 of the engine speed command software for implementing the Manual Mode operational engine speed control parameters. When the ESCM 34 receives a mode selection input from the engine speed control mode selection device indicating the Manual Mode has been selected, the operator can control engine speed between an upper and lower threshold limit, such as from 0% to 100%, by adjusting the position of the throttle control mechanism 46. In response to the operator adjustments, the throttle control mechanism 46 sends electronic signals to the ESCM 34 indicative of the engine speed requested by the operator. Consequently, the ESCM 34 outputs a command signal to the ECU 38 instructing the ECU 38 to set the engine speed to the speed corresponding directly to the engine speed indicated by the throttle control mechanism 46.

For example, in various embodiments, as exemplarily illustrated in FIG. 3, if the Manual Mode is selected, as indicated at 202, the ESCM 34 receives throttle control commands from the throttle control mechanism 46 indicative of a desired throttle setting (e.g., 0% to 100% throttle), as indicated at 204. Based on the received throttle commands, the ESCM 34 outputs command signals to the ECU 38 to set and maintain the engine throttle at a setting for operating the ICE 10 at the engine speed corresponding to the to the position of throttle control mechanism 46, as indicated at 206 and 208. Subsequently, if the operator changes the position of the throttle control mechanism 46 in order to increase or decrease engine speed, the ESCM 34 receives the new throttle control commands indicative of a desired new throttle setting (e.g., 0% to 100% throttle), whereafter the ESCM 34 outputs command signals to the ECU 38 to set and maintain the engine throttle at a new setting for operating the ICE 10 at the new engine speed corresponding to the to the new position of throttle control mechanism 46.

Figure 4:
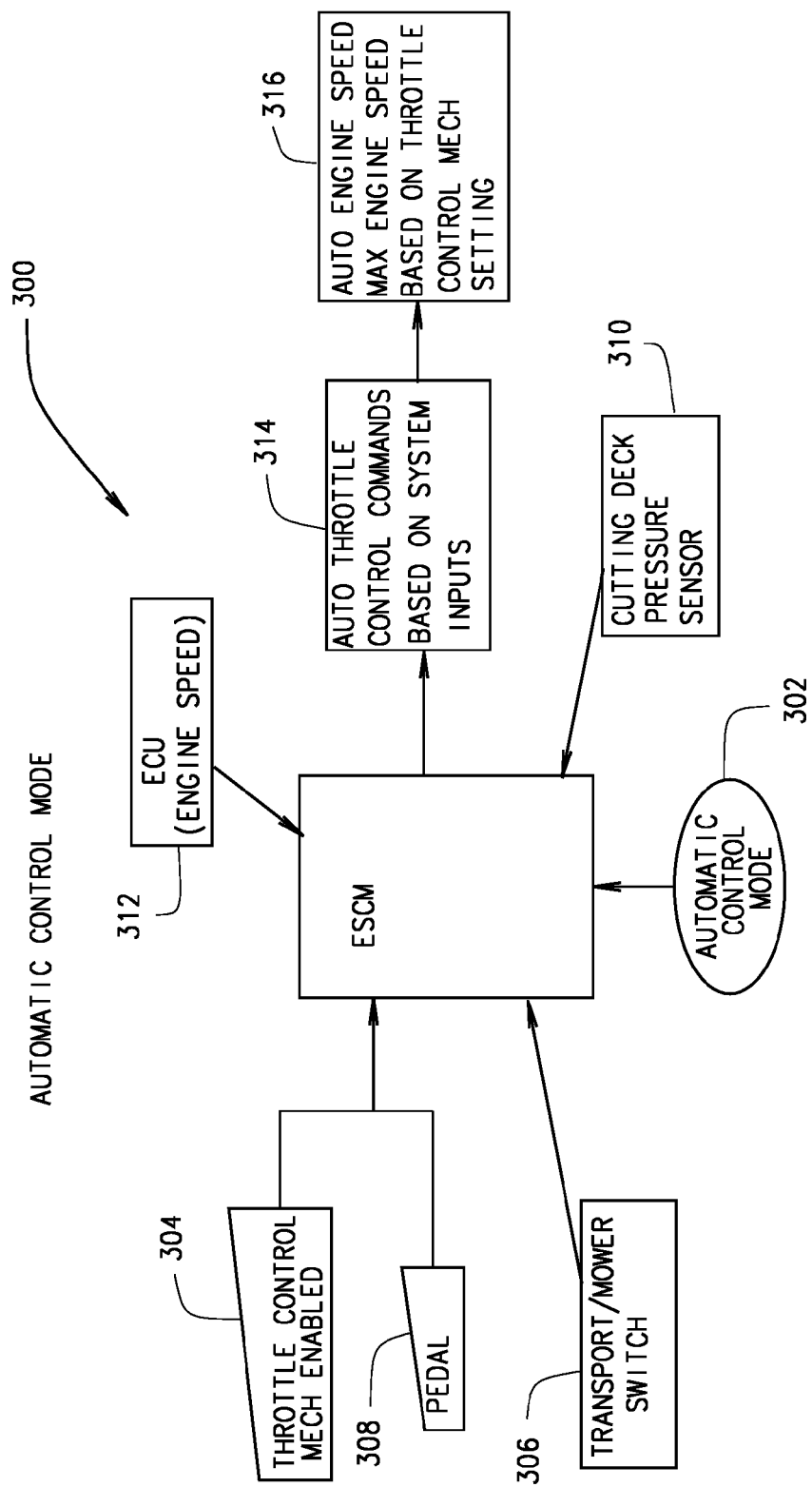
FIG. 4 is a flow chart illustrating an Automatic Control Mode functionality of the electronic engine speed control module, shown in FIG. 1, in accordance with various embodiments of the present disclosure.

Referring now to FIG. 4, in various embodiments, wherein the vehicle 14 includes the throttle control mechanism 46, the engine speed command software can include an Automatic Control Mode, e.g., a software routine 300 of the engine speed command software for implementing the Automatic Control Mode operational engine speed control parameters. When the ESCM 34 receives a mode selection input from the engine speed control mode selection device indicating the Automatic Control Mode has been selected, the ESCM 34 allows the operator to set a maximum engine speed, via positioning of the throttle control mechanism 46, but automatically controls the engine speed based on inputs from the various systems, sensors and electronic controllers of the vehicle 14 (sometimes referred to herein as vehicle inputs), such as one or more of the ECU 38, the accelerator pedal 42, the throttle control mechanism 46, the operator interface 50, the PTO switch 54, the cutting unit position sensor 58, the cutting unit load/pressure sensor 62, and the transport/mower switch 66.

For example, in various embodiments, as exemplarily illustrated in FIG. 4, if the Automatic Control Mode is selected, as indicated at 302, the ESCM 34 receives throttle control commands from the throttle control mechanism 46 indicative of a maximum throttle setting (e.g., 0% to 100% throttle), as indicated at 304. The ESCM 34 additionally receives inputs from the transport/mower switch 66 to indicate whether the operator has put the vehicle 14 in transport or mower mode, and from the accelerator pedal 42 indicative of a desired terrestrial speed of the vehicle 14, as indicated at 306 and 308. The ESCM 34 further receives in real time inputs from one or more of the various systems, sensors and electronic controllers of the vehicle 14, e.g., from the cutting unit pressure sensor 62 indicative of the present load (or resistive force) on the cutting unit blades, and from the ECU 38 indicative of the present engine speed, as indicated at 310 and 312. Then based on the various real time inputs, the ESCM 34 determines a real time optimal, or target, engine speed, i.e., the most efficacious and fuel efficient engine speed, for performing the present vehicle 14 task. The ESCM 34, then regularly outputs (e.g., outputs at a predefined frequency or period, or aperiodically outputs) command signals to the ECU 38 to control the engine throttle such that the rotational speed of the ICE 10 is regularly adjusted (e.g., adjusted at a predefined frequency or period, or aperiodically adjusted) in real time to the determined optimal engine speed for performing the present vehicle 14 task, having the maximum engine speed set by the throttle control mechanism 46 setting, as indicated at 314 and 316. That is, the ESCM 34 will command operation of the ICE 10 at a speed that will allow the vehicle 14 to effectively perform the task at hand while operating the ICE 10 at a speed that will achieve a desired fuel efficiency.

For example, in various implementations when in the Automatic Control Mode, once the vehicle 14 is started, the ESCM 34 sets, via command signals to the ECU 38, the speed of the ICE 10 to 50% throttle for a predetermined period of time, e.g., 2 seconds, then sets the engine speed to idle, e.g., 300 RPMs. As long as the ESCM 34 receives no vehicle inputs, e.g., inputs from the accelerator pedal 42, the ESCM 34 will maintain the engine speed at idle. If the transport/mower switch 66 is set to transport and the accelerator pedal 42 is depressed, the ESCM 34 will command the ECU 38 to set the operational speed of the ICE 10 to the speed corresponding to the present throttle control mechanism 46 position. Then, based on the real time ECU 38 inputs, the ESCM 34 will command the ECU 38 to adjust, in real time, the engine speed to optimize the engine speed for performing the present vehicle 14 task, having the maximum engine speed set by the throttle control mechanism 46 setting. If, thereafter, the accelerator pedal 42 is released and the vehicle 14 comes to a stop for a predetermined period of time, e.g., 2 seconds, the ESCM 34 will command the engine speed to drop back to idle.

Alternatively, if the transport/mower switch 66 is set to mower and the accelerator pedal 42 is depressed, the ESCM 34 will command the ECU 38 to change the operational speed of the ICE 10 to the speed corresponding to the present the throttle control mechanism 46 position, but also communicates with the ECU 38 to monitor the engine speed and the cutting unit pressure sensor 58 to determine if a load is being exerted on the ICE 14 as a result of vehicle operating conditions, e.g., a steep incline or mowing through heavy grass. Based on the inputs received from the ECU 38 and the cutting unit pressure sensor 58, the ESCM 34 will automatically, in real time, command an increase or decrease of engine speed to compensate for any increase or decrease in load on the ICE 14.

For example, in some embodiments, if the engine speed is between 1600 and 2200 RPMs and is reducing due to resistance on the cutting unit(s) 30 or the vehicle 14 is traversing a steep incline when the accelerator pedal 42 and the throttle control mechanism 46 are in the maximum position and substantially constant, the ESCM 34 will command a reduction, such as a 1%-5% reduction, of the EDC coil 28 output every 0.5 seconds (or other predetermined frequency) for a defined RPM drop, such as for every 10 RPM drop (or other defined increment of RPM drop), in engine speed to reduce the terrestrial vehicle speed until 1600 RPMs is reached or the engine speed starts to increase. Conversely, in some embodiments, if the engine speed is between 1600 and 2200 RPMs and is increasing due to the load on the ICE 10 decreasing when the accelerator pedal 42 and the throttle control mechanism 46 are in the maximum position and substantially constant, the ESCM 34 will command an increase, such as a 1%-5% increase, in the EDC coil 28 output every 0.5 seconds (or other predetermined frequency) for a defined RPM rise, such as for every 10 RPM rise (or other defined increment of RPM rise), in the engine speed to increase terrestrial vehicle speed until 2200 RPMs is reached or the engine speed starts decreasing.

Additionally, or alternatively, if the cutting unit pressure switch 62 activates, indicating that the cutting blades of the cutting unit(s) 30 have encounter a certain amount of resistance, and accelerator pedal 42 is substantially constant, the ESCM 34 will command a reduction, such as a 1%-5% reduction, of the EDC coil 28 output every 0.5 seconds (or other predetermined frequency) for every 10 RPMs of engine speed to reduce the terrestrial vehicle speed until the cutting unit pressure switch 62 is off or the voltage to the EDC coil 28 reaches a defined low threshold/parameter, indicating that the terrestrial vehicle speed has been reduced to a predetermined low speed. Subsequently, if the cutting unit pressure switch 62 is deactivated for more than 2 seconds (or any other predetermined temporal period) and accelerator pedal 42 is substantially constant, the ESCM 34 will command an increase, such as a 2%-6% increase in the voltage to the EDC coil 28 every 0.5 seconds (or other predetermined frequency) to increase terrestrial vehicle speed until the cutting unit pressure switch 62 is activated or a maximum terrestrial vehicle speed has been reached.

Furthermore, in various implementation, when the ESCM 34 is set to Automatic Control Mode and the cutting unit(s) 30 are lowered, if the vehicle 14 is placed in Reverse, the ESCM 34 will command lifting of the cutting unit(s) 30 to an intermediate position, i.e., a cross cut position where the cutting unit(s) 30 are not all the way up and not all the way down, and command that the cutting blades be turned off. Thereafter, if the vehicle 14 is placed in Forward, the ESCM 34 will command lowering the cutting unit(s) 30 to a cutting position, turn the cutting blades, and return to Automatic Control Mode operation as described above.

Additionally, in various implementations, when the ESCM 34 is set to Automatic Control Mode, and the cutting unit(s) 30 are lowered, if the pressure switch 62 is activated, the ESCM 34 will command the EDC coil 28 to reduce and maintain the engine speed at a predetermined speed until pressure switch 62 is no longer active.

Figure 5:
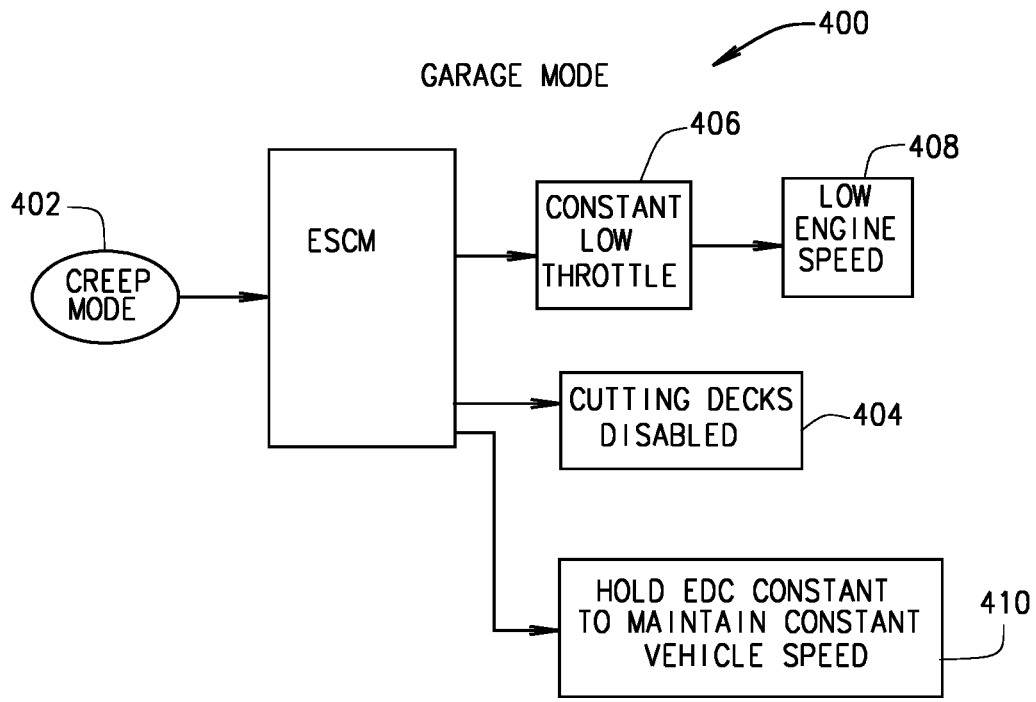
FIG. 5 is a flow chart illustrating a Garage Mode functionality of the electronic engine speed control module, shown in FIG. 1, in accordance with various embodiments of the present disclosure.

Referring now to FIG. 5, in various embodiments, wherein the vehicle 14 does not include the throttle control mechanism 46, the engine speed command software can include a Garage Mode, e.g., a software routine 400 of the engine speed command software for implementing the Garage Mode operational engine speed control parameters. When the ESCM 34 receives a mode selection input from the engine speed control mode selection device indicating the Garage Mode has been selected, the ESCM 34 will command the ECU 38 to set the engine throttle to a fixed point or value below a predetermined maximum setting (e.g., fixed at or below 50% full throttle, such as by way of example, 30% full throttle) such that the terrestrial speed of the vehicle 14 will not exceed a predetermined speed, e.g., 5 MPH, regardless of whether the transport/mower switch 66 is set to transport mode or mower mode. The Garage Mode is suitable for operation of the vehicle 14 within a garage, parking facility or other confined area. When in the Garage Mode the ESCM 34 will disable the cutting unit(s) 30 to render the respective grass cutting blades inoperable. Additionally, in various implementations, when in the Garage Mode the ESCM 34 will disable some vehicle functionality, e.g., the cutting unit(s) 30, while other vehicle functionality may be selectively enabled, e.g., headlights.

For example, in various embodiments of the Garage Mode, as exemplarily illustrated in FIG. 5, if Garage Mode is selected, as indicated at 402, the ESCM 34 disables the cutting unit deck(s) 30, as indicated at 404. Additionally, the ESCM 34 will output command signals to the ECU 38 to set and maintain the engine throttle at a fixed point or value below the maximum setting, e.g., between 25% and 50% of full throttle, such that the ICE 10 will be operated at a substantially constant low speed, e.g., between 600 and 800 RPMs, as indicated at 406 and 408. Still further, the ESCM 34 will command the EDC 28 to maintain a substantially constant low terrestrial speed of the vehicle 14, e.g., 5 MPH, as indicated at 410.

Figure 6:
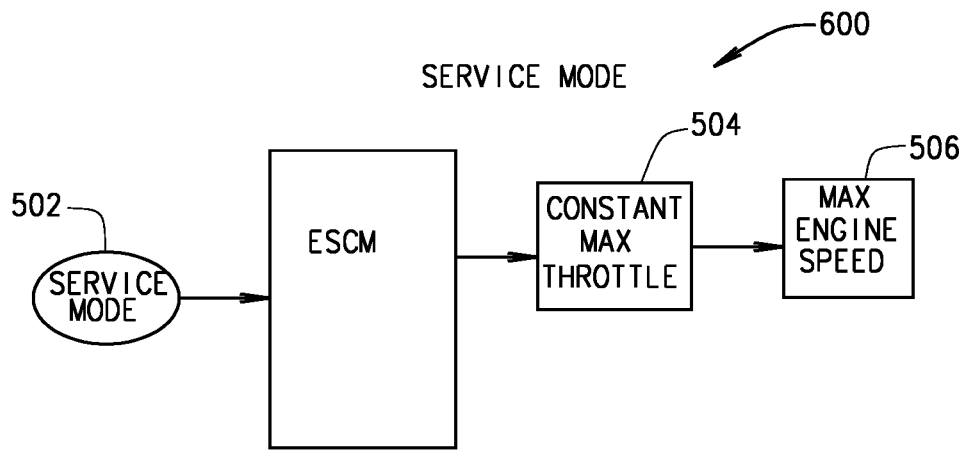
FIG. 6 is a flow chart illustrating a Service Mode functionality of the electronic engine speed control module, shown in FIG. 1, in accordance with various embodiments of the present disclosure.

Referring now to FIG. 6, in various embodiments, such as some embodiments in which the vehicle 14 does not include the throttle control mechanism 46, the engine speed command software can include a Service Mode, e.g., a software routine 500 of the engine speed command software for implementing the Service Mode operational engine speed control parameters. In various embodiments, as exemplarily illustrated in FIG. 6, if the Service Mode is selected, as indicated at 502, the ESCM 34 outputs command signals to the ECU 38 to set and maintain the engine throttle at a predetermined setting, e.g., 70% to 100%, for operating the ICE 10 at a predetermined maximum engine speed, e.g., 2250 to 3000 RPMs, as indicated at 504 and 506.

Figure 7A:
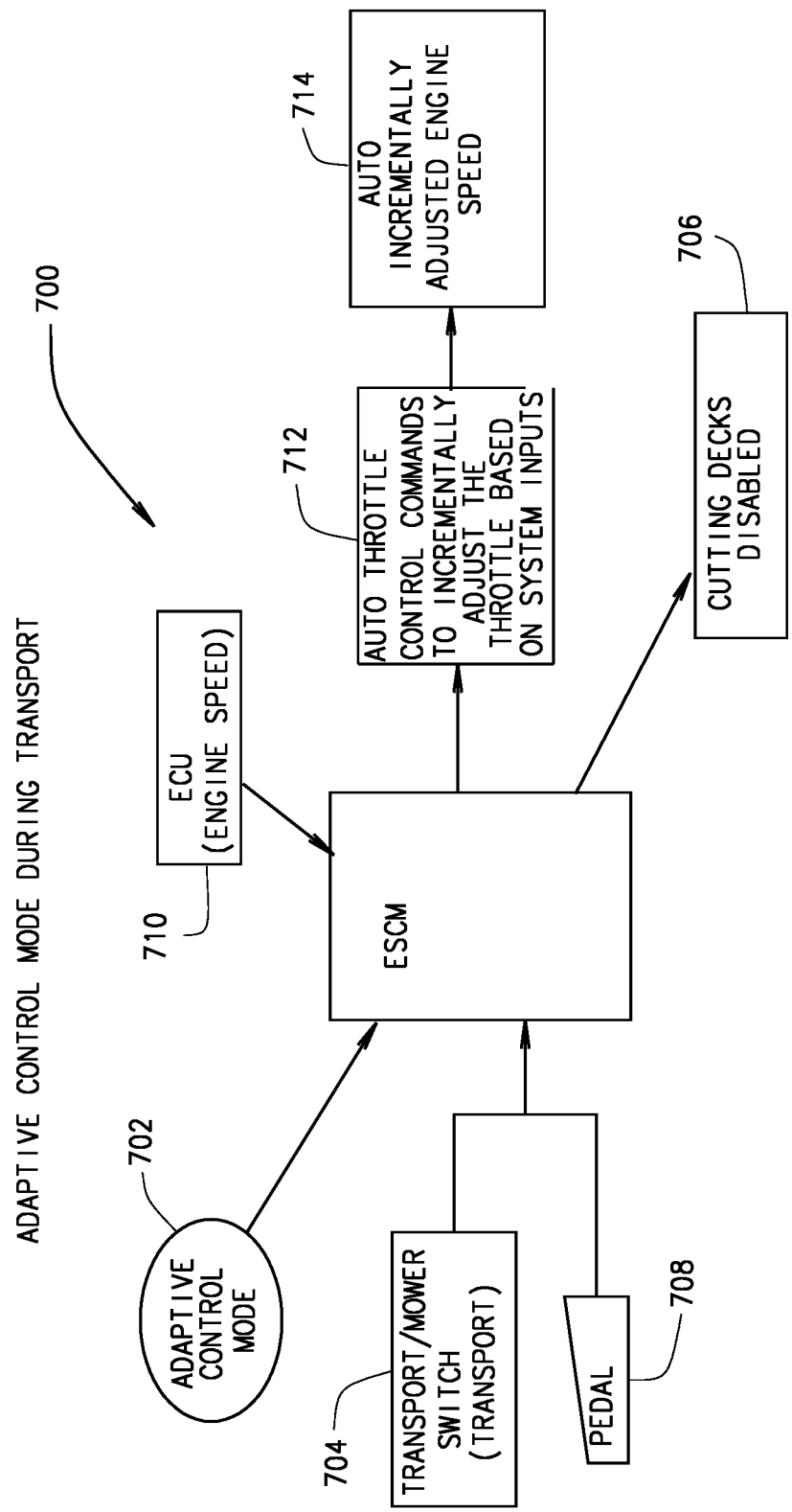
FIG. 7A is a flow chart illustrating an Adaptive Control Mode functionality of the electronic engine speed control module, shown in FIG. 1, in accordance with various embodiments of the present disclosure.
Figure 7B:
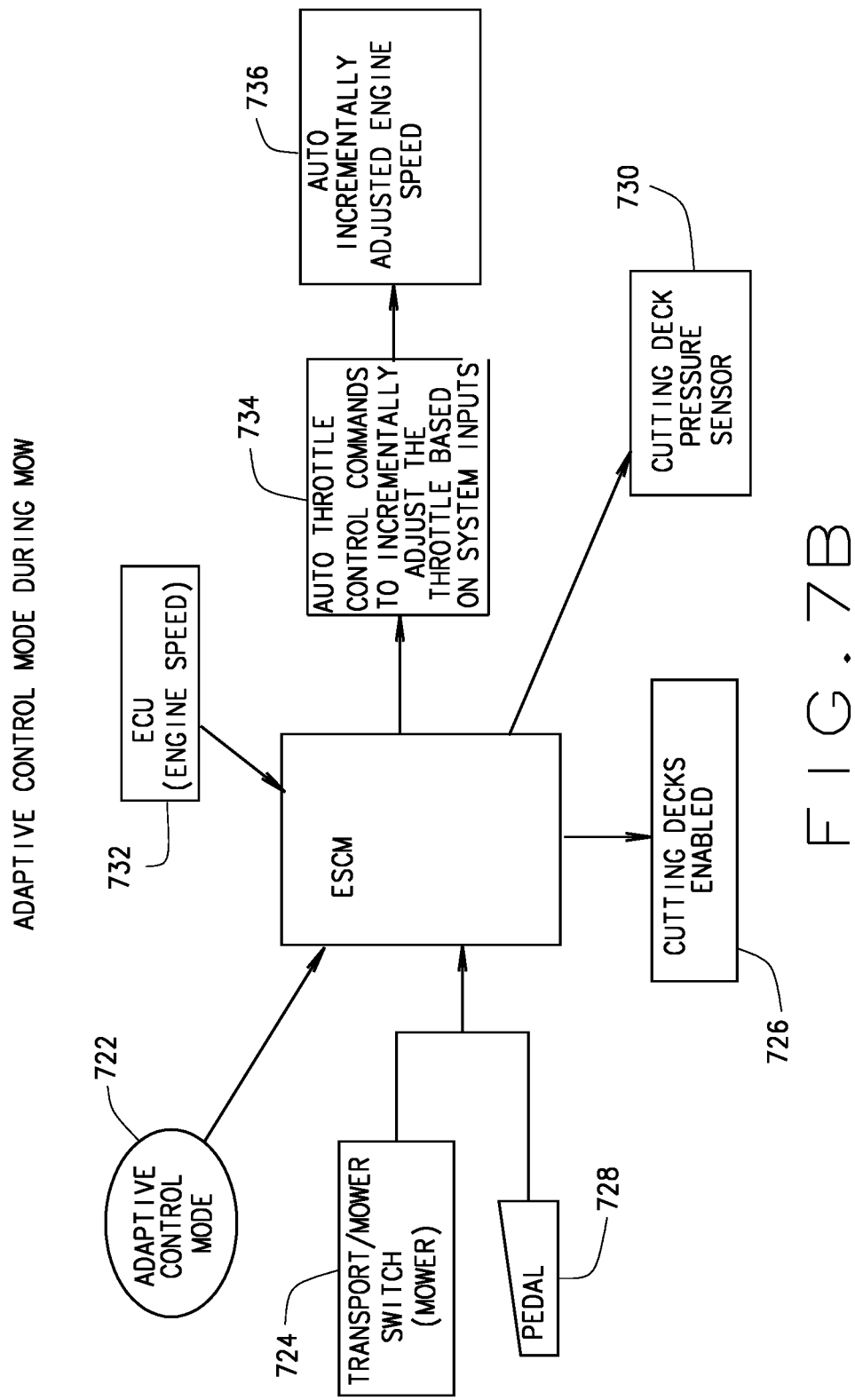
FIG. 7B is a flow chart illustrating the Adaptive Control Mode functionality in accordance with various other embodiments of the present disclosure.

Referring now to FIGS. 7A and 7B, in various embodiments, wherein the vehicle 14 does not include the throttle control mechanism 46, the engine speed command software can include an Adaptive Control Mode, e.g., a software routine 700 of the engine speed command software for implementing the Adaptive Control Mode operational engine speed control parameters. When the ESCM 34 receives a mode selection input from the engine speed control mode selection device indicating the Adaptive Control Mode has been selected, the ESCM 34 automatically controls the engine speed based on inputs from the various systems, sensors and electronic controllers of the vehicle 14 (sometimes referred to herein as vehicle inputs), such as one or more of the ECU 38, the accelerator pedal 42, the operator interface 50, the PTO switch 54, the cutting unit position sensor 58, the cutting unit load/pressure sensor 62, and the transport/mower switch 66. More particularly, the ESCM 34 commands automatic adjustments of the engine throttle value/percentage based on the various vehicle functions selected by the operator and various inputs received from the various systems, sensors and electronic controllers of the vehicle 14.

For example, in various embodiments of the Adaptive Control Mode, as exemplarily illustrated in FIG. 7A, if the Adaptive Control Mode is selected and the transport/mower switch 66 is set to Transport, as indicated at 702 and 704, the ESCM 34 commands disablement of the cutting unit(s) 30, as indicated at 706, and receives input from the accelerator pedal 42 indicative of a terrestrial vehicle speed desired by the operator, as indicated at 708. The ESCM 34 further receives in real time inputs from one or more of the various systems, sensors and electronic controllers of the vehicle 14, e.g., from the ECU 38 indicative of the present engine speed, as indicated at 710. Then based on the various real time inputs, the ESCM 34 determines a real time optimal engine speed, e.g., the most efficacious and fuel efficient engine speed, for performing the present vehicle 14 task. Without the operator adjusting the input from the accelerator pedal 42, the ESCM 34 then regularly outputs (e.g., outputs at a predefined frequency or period, or aperiodically outputs) command signals to the ECU 38 to control and make incremental adjustments, such as step function adjustments, to the engine throttle such that the rotational speed of the ICE 10 is regularly incrementally adjusted (e.g., is incrementally adjusted at a predefined frequency or period, or aperiodically incrementally adjusted) in real time on an ongoing basis to establish the determined optimal engine speed for performing the present vehicle 14 task, as indicated at 712 and 714. That is, without adjustment of the accelerator pedal 42, and hence, without adjustment of the desired terrestrial vehicle speed setting, the ESCM 34 will command operation of the ICE 10 at a speed that will allow the vehicle 14 to effectively perform the task at hand while operating the ICE 10 at a speed that will achieve a desired fuel efficiency. The incremental/step adjustments commanded by the ESCM 34 are based on predefined ramp rates retrieved from a software table stored in the ESCM 34.

Alternatively, in various other embodiments of the Adaptive Control Mode, as exemplarily illustrated in FIG. 7B, if the Adaptive Control Mode is selected and the transport/mower switch 66 is set to Mower, as indicated at 722 and 724, the ESCM 34 commands enablement of the cutting unit(s) 30, as indicated at 726, and receives input from the accelerator pedal 42 indicative of a terrestrial vehicle speed desired by the operator, as indicated at 728. The ESCM 34 further receives inputs from the cutting unit pressure sensor 62 indicative of the present load (or resistive force) on the blades of the cutting unit(s) of the cutting unit 30, and from the ECU 38 indicative of the present engine speed, as indicated at 730 and 732. Then based on the real time various inputs, the ESCM 34 determines a real time optimal engine speed, i.e., the most efficacious and fuel efficient engine speed, for performing the present vehicle 14 task. Then, without adjustment of the desired terrestrial vehicle speed by the ESCM 34, the ESCM 34 regularly outputs (e.g., outputs at a predefined frequency or period, or aperiodically outputs) command signals to the ECU 38 to control and make incremental/step adjustments to the engine throttle such that the rotational speed of the ICE 10 is regularly incrementally adjusted (e.g., incrementally adjusted at a predefined frequency or period, or aperiodically incrementally adjusted) in real time to establish the determined optimal engine speed for performing the present vehicle 14 task, as indicated at 734 and 736. That is, the ESCM 34 will command operation of the ICE 10 at a speed that will allow the vehicle 14 to effectively perform the task at hand while operating the ICE 10 a speed that will achieve a desired fuel efficiency.

Accordingly, as described above, when in the Adaptive Control Mode, the ESCM 34 automatically commands the ECU 38 to set/adjust the throttle value to adjust the engine speed, without adjustment to the accelerator pedal 42 by the operator, based on the various vehicle inputs and cutting unit inputs received by the ESCM 34. For example, in various mowing mode implementations, the ESCM 34 commands the throttle to be set (e.g., commands the ECU 38 to set the throttle) at a defined setting, e.g., 50%, during ignition and start up, and commands incremental/step increases in engine speed to 100% full throttle during mowing. The transition of engine speed from idle speed, to various intermediate values, to 100% full throttle are attained per the predefined ramp rate table stored on the ESCM 34.

As an example, if the transport/mower switch 66 is set to Mower, the ESCM 34 receives the mower mode input from the transport/mower switch 66 and commands the throttle to be set to a defined setting, e.g., 50% full throttle position, that correlates to a defined target engine speed at which the vehicle 14 can effectively and efficiently perform the task at hand (e.g., high quality and efficient grass cutting). Then, if there is a change of load on a vehicle system, e.g., a load on the cutting unit(s) blades such that the engine needs to increase in speed so that the vehicle 14 can continue to effectively and efficiently perform the task at hand the ESCM 34 effectuates a predefined ramp-up rate to increase engine RPMs.

Hence, in such embodiments, the ESCM 34 will not command adjustment of the throttle position to instantaneously increase the engine speed to the needed engine speed. Rather, the ESCM 34 will command that the engine speed be incrementally stepped up or stepped down to incrementally increase or decrease the engine speed until the engine speed equals a target, or desired, speed. Moreover, the ESCM 34 regularly (e.g., at a predetermined frequency or period, or aperiodically), in real time, monitors the various vehicle systems, sensors and electronic controllers, and regularly commands (e.g., commands at a predetermined frequency or period or aperiodically commands) the incremental increasing and decreasing of engine speed to regularly maintain the engine speed at the target speed.

More specifically, for a desired target engine speed (e.g., 50% full throttle), the ESCM 34 will read the real time speed of the ICE 10 from the ECU 38 and compare this value with the target value. If the real time engine speed is less than or greater than the target value, the ESCM 34 will determine whether the difference between target and real time speed, i.e., a 'delta Y', is greater than a predetermined deviation threshold (e.g., 100 RPMs). If the delta Y is greater than deviation threshold, the ESCM 34 will command one or more incremental X % increases or decreases in throttle setting, e.g., 5% made at predetermined set intervals t, e.g., 1 second, until the target speed is reached. For example, if the ICE 10 is operating at a target value of 50% throttle, and the vehicle 14 begins to traverse an incline that causes the engine RPMs to drop, the ESCM 34, due to its regular monitoring of the real time engine speed, will detect the drop in engine speed and determine the delta Y. If the delta Y is equal to or greater than the predetermined deviation threshold, the ESCM 34 will command adjustment of the throttle to increase the ICE 10 RPMs by X %, e.g., 5%. Subsequently, while maintaining the engine speed at the X % increase, the ESCM 34 will wait the predetermined time interval t, such as 1 second in the instant example, and again determine the delta Y. If the delta Y is still greater than the deviation threshold, the ESCM 34 will command another adjustment, e.g., an additional adjustment, of the throttle to increase the ICE 10 RPMs by another X %, e.g., in addition to the previous adjustment. The ESCM 34 will repeat the delta Y calculation every time interval t until the delta Y is less than the deviation threshold.

Subsequently, if the real time engine speed is substantially equal to the target RPMs (e.g., the delta Y is less than the deviation threshold) for the time interval t, the ESCM 34 will command a decrease in the throttle setting to decrease the engine speed by Z %, e.g., 5%. Then, after the time interval t, if the real time engine speed remains below the deviation threshold, the ESCM 34 will again decrease throttle setting by another Z %, e.g., an additional Z %. Hence, the ESCM 34 will regularly monitor (e.g., monitors at a predetermined frequency or period or aperiodically monitors) the real time engine speed and compare it to the target engine speed to calculate the delta Y value. If the delta Y value is greater than the deviation threshold value, the ESCM 34 will automatically command increment increases or decreases as needed in order to maintain the real time engine speed substantially equal to the target speed, e.g., in order to maintain the delta Y at values less than the predetermined deviation threshold. As described above, the target speed is determined by the ESCM 34 based on the various vehicle settings and input, such as accelerator pedal 42 input, ignition and start status, status of the PTO 54, status of the transport/mower switch 66, whether the vehicle is standing still and in idle or moving at a desired terrestrial speed, etc.

In various embodiments, when in the Adaptive Control Mode it is envisioned that if the ESCM 34 has incrementally increased the engine speed as described above, but has reached a predetermined maximum threshold of full throttle, e.g., 100%, 95%, 90%, etc., of full throttle, the ESCM 34 can command the EDC coil 28 to make an adjustment to lower the terrestrial speed of the vehicle 14 in order to lessen the load on the ICE 10 and thereby increases the engine speed, as described above with regard to the Automatic Control Mode.

For example, if the ICE 10 is operating at a target value of 90% full throttle (e.g., 2700 RPMs), and the vehicle 14 begins to traverse an incline and/or the load on the cutting units 30 increases causing the engine RPMs to drop, the ESCM 34, due to its regular monitoring of the real time engine speed, will detect the drop in engine speed and determine the delta Y. Then, as described above, if the delta Y is equal to or greater than the predetermined deviation threshold, the ESCM 34 will command adjustment of the throttle to increase the ICE 10 RPMs by X %, e.g., 5%. Subsequently, the ESCM 34 will wait the predetermined time interval t, e.g., 1 second, and again determine the delta Y. If the delta Y is still greater than the deviation threshold, the ESCM 34 will command another adjustment of the throttle to increase RPMs of the ICE by another X %. The ESCM 34 will repeat the delta Y calculation every time interval t and increase engine speed until the delta Y is less than the deviation threshold, or the engine speed has reached the maximum threshold (e.g., 80% of full throttle, or 2400 RPMs). If the engine speed has reached the maximum threshold and the delta Y is still greater than the deviation threshold, the ESCM 34 can command a reduction (e.g., 1%-5%) of the EDC coil 28 output every 0.5 seconds (or other predetermined frequency) for every defined number of RPMs the delta Y is greater than the deviation threshold (e.g., 3% reduction for every 10 RPMs the delta Y is greater than the deviation threshold), thereby reducing terrestrial vehicle speed and the load on the ICE 10. Thereafter, the ESCM 34 will continue to monitor the delta Y and incrementally reduce the EDC coil 28 output until the real time engine speed is substantially equal to the target RPMs (e.g., the delta Y is less than the deviation threshold) for the time interval t. Once the real time engine speed is substantially equal to the target RPMs, the ESCM 34 will command a decrease in the throttle setting to decrease the engine speed by Z %, e.g., 5%, as described above.

In various other embodiments, when in the Adaptive Control Mode and the ESCM 34 has incrementally increased the engine speed, as described above, to a predetermined maximum threshold, e.g., 100%, 95%, 90%, etc., of the target value, the ESCM 34 can command an adjustment in the terrestrial speed of the vehicle 14 in order to lessen the load on the ICE 10, as described above with regard to the Automatic Control Mode.

For example, if the ICE 10 is operating at a target value of 80% full throttle (e.g., 2400 RPMs), and the vehicle 14 begins to traverse an incline and/or the load on the cutting units increases that causes the engine RPMs to drop, the ESCM 34, due to its regular monitoring of the real time engine speed, will detect the drop in engine speed and determine the delta Y. Then, as described above, if the delta Y is equal to or greater than the predetermined deviation threshold, the ESCM 34 will command adjustment of the throttle to increase the ICE 10 RPMs by X %, e.g., 5%. Subsequently, the ESCM 34 will wait the predetermined time interval t, such as 1 second in the instant example, and again determine the delta Y. If the delta Y is still greater than the deviation threshold, the ESCM 34 will command another adjustment of the throttle to increase the ICE 10 RPMs by another X %. The ESCM 34 will repeat the delta Y calculation every time interval t and engine speed increase until the delta Y is less than the deviation threshold, or the engine speed has reached the maximum threshold (e.g., 90%) of the target value of 80% full throttle (e.g., 90% of 2400 RPMs, or 2160 RPMs). If the engine speed has reached the maximum threshold and the delta Y is greater than the deviation threshold, the ESCM 34 can command a reduction (e.g., 1%-5%) of the EDC coil 28 output every 0.5 seconds (or other predetermined frequency) for every defined number of RPMs the delta Y is greater than the deviation threshold (e.g., 3% reduction for every 10 RPMs the delta Y is greater than the deviation threshold), thereby reducing terrestrial vehicle speed and the load on the ICE 10. Thereafter, the ESCM 34 will continue to monitor the delta Y and incrementally reduce the EDC coil 28 output until the real time engine speed is substantially equal to the target RPMs (e.g., the delta Y is less than the deviation threshold) for the time interval t. Once the real time engine speed is substantially equal to the target RPMs, the ESCM 34 will command a decrease in the throttle setting to decrease the engine speed by Z %, e.g., 5%, as described above.

Furthermore, in various implementations, similar to the Automatic Control Mode described above, when in the Adaptive Control Mode, once the vehicle 14 is started, the ESCM 34 sets, via command signals to the ECU 38, the speed of the ICE 10 to a predetermined start speed (e.g., 50% throttle) for a predetermined period of time (e.g., 2 seconds) then sets the engine speed to an idle speed, e.g., 300 RPMs. Subsequently, as long as the ESCM 34 does not receives any vehicle inputs (e.g., acceleration inputs from the accelerator pedal 42) the ESCM 34 will maintain the engine speed at the idle speed. Consequently, if the accelerator pedal 42 is depressed, or another vehicle input is received (e.g., the transport/mower switch 66 is set to mower), the ESCM 34 will command the ECU 38 to set the operational speed of the ICE 10 to a predetermined target speed, and then adaptively control the engine speed as described above.

Figure 8:
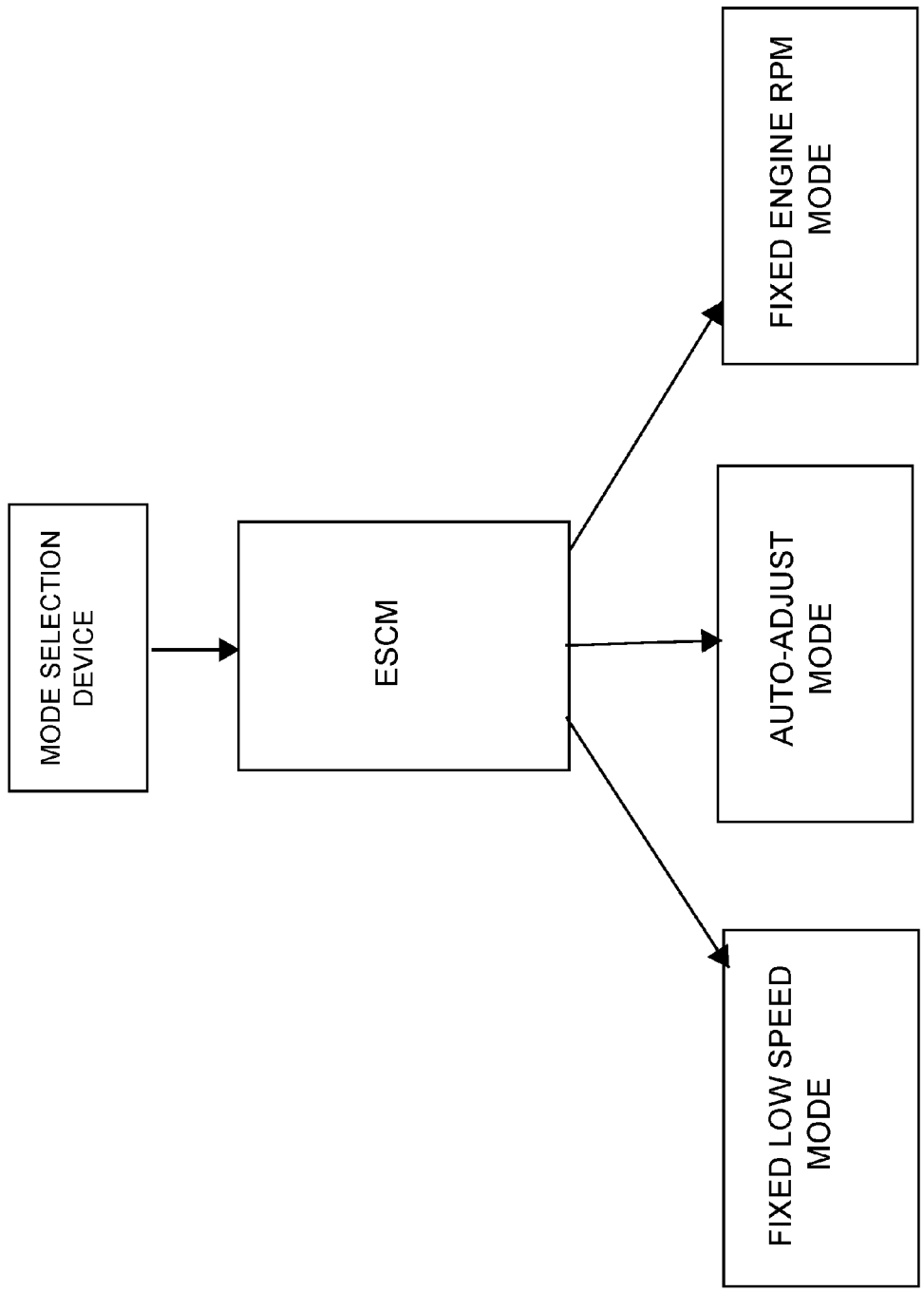
FIG. 8 is flow chart illustrating the functionality of the electronic engine speed control module, shown in FIG. 1, configured to implement the functionality of a plurality of the various control modes, in accordance with various embodiments of the present disclosure.

Referring now to FIG. 8, it should be understood that although six specific speed control modes (e.g., the Creep Mode, the Manual Mode, the Automatic Control Mode, the Garage Mode, the Service Mode and the Adaptive Control Mode) have been described in detail above, it is envisioned that the ESCM 34 is structured and operation to implement features and function of any combination of the six modes and/or any one or more other mode(s) that comprise any combination the features and functions described above with regard to any one or more of six modes. For example, as illustrated by way of example in FIG. 8, in various embodiments, the ESCM 34 can be structured and operable to selectively implement, via input from the mode selection device, each of: a Fixed Low Speed Mode that can include selected features and functions of either one of, or a combination of selected features and functions of, the Creep and Garage Modes described above; an Auto-Adjust Mode that can include selected features and functions of either one of, or a combination of selected features and functions of, the Automatic and Adaptive Control Modes described above; and a Fixed Engine RPM Mode that can include selected features and functions of either one of, or a combination of selected features and functions of, the Manual and Service Modes described above.

For example, in various implementations, when in the Fixed Low Speed Mode the ESCM 34 can control the operation of the ICE 10 such that engine speed is set to a fixed value, as described above with regard to the Garage Mode, and/or such that the engine speed cannot exceed a designated threshold, as described above with regard to the Creep Mode, thereby controlling the terrestrial speed of the vehicle 14 such that the terrestrial speed will not exceed a predetermined speed, e.g., 5 MPH. Therefore, the Fixed Low Speed Mode would be advantageous for implementation when maneuvering the vehicle 14 within confined areas. By way of further example, in various implementations, when in the Auto-Adjust Mode the ESCM 34 can control the operation of the ICE 10 by: implementing any of the features and functions described above with regard to the Automatic Control Mode such as auto-idling, manually setting a maximum engine speed if the vehicle 14 has a throttle control mechanism and/or reducing terrestrial speed of the vehicle 14 to compensate for an increase in load on the ICE 10; and/or implementing any of the features and functions described above with regard to the Adaptive Control Mode, such as the incrementally adjusting the engine speed to compensate for increase and/or decrease in load on the ICE 10. By way of still further example, in various implementations, when in the Fixed Engine RPM Mode the ESCM 34 can control the operation of the ICE 10 by allowing the operator to control the engine speed by adjusting a throttle control mechanism, as described above with regard to the Manual Mode, or by maintaining the engine throttle at a predetermined setting, as described above with regard to the Service Mode.

Figure 9:
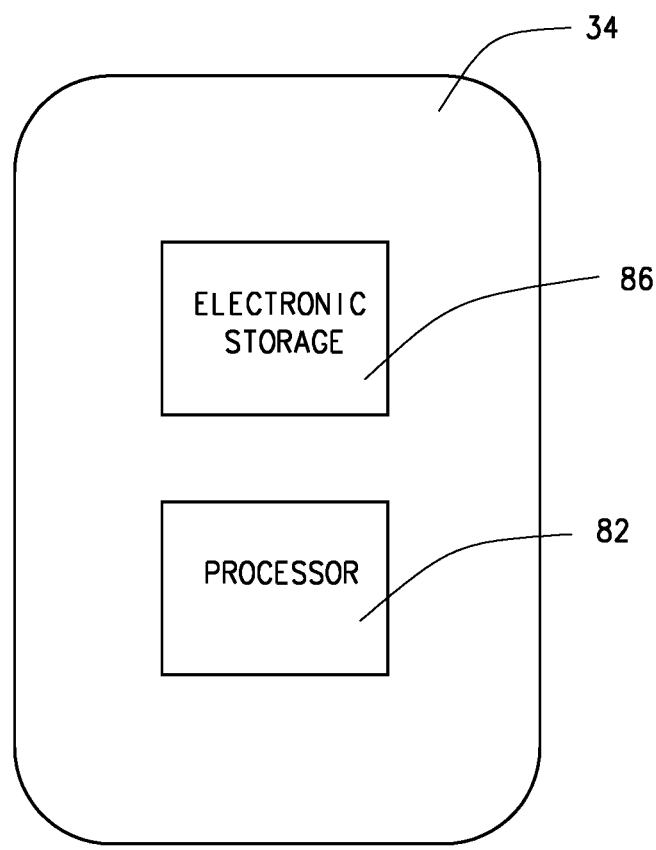
FIG. 9 is an exemplary block diagram of a computer based engine speed command module of the turf-care vehicle shown in FIG. 1, in accordance with various embodiments of the present disclosure.

Referring now to FIG. 9, as described above, in various embodiments, the ESCM 34 module can be a computer-based programmable system or device suitable for storing and executing the engine speed command software as described herein. For example, in various embodiments the ESCM 34 can be a computer based system or device that generally includes at least one processor 82 suitable to execute all software, programs, algorithms, described herein, e.g., the engine speed command software, and at least one electronic storage device 86 that comprises a computer readable medium for storing such things as software packages or programs and algorithms (e.g., the engine speed command software), and for storing such other things as digital information, data, look-up tables, spreadsheets and databases.

Alternatively, as described above, in various embodiments, the ESCM 34 can comprise or be part of an electronic circuit that is structured and operable to store the engine speed command software and other digital information, data, look-up tables, spreadsheets and databases, and to implement the engine speed command software as described above using programmable hardware. For example, the ESCM 34 can comprise one or more, or be part of, an application specific integrated circuit (e.g., an ASIC), a combinational logic circuit; a field programmable gate array (FPGA); a processor (shared, dedicated, or group) that executes software code; other suitable hardware components that provide the functionality described above; or a combination of some or all of the above, such as in a system-on-chip.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method for automatically controlling an engine of a turf-care vehicle, wherein the turf-care vehicle comprises:
   an internal combustion engine structured and operable to provide motive force to the vehicle;
   an electrical displacement control structured and operable to control an amount of torque output by a transmission of the vehicle for controlling a terrestrial speed of the vehicle;
   an engine control unit structured and operable to control a rotational speed of the engine; and
   an engine speed control module structured and operable to:
      receive data inputs from the electrical displacement control, the engine control unit, and a plurality vehicle components;
      execute engine speed command software utilizing the data inputs; and
      via execution of the engine speed command software, output commands to at least one of the electrical displacement control and the engine control unit to selectively implement one a plurality of engine speed control modes implementable by the engine speed control module;
   wherein said method comprising;
   receiving, at the engine speed control module, a mode selection input from an engine speed control mode selection device of the vehicle, the mode selection input indicative of which of the plurality of engine speed modes are to be implemented by the engine speed control module;
   receiving, at the engine speed control module, data inputs from at least one of the electrical displacement control, the engine control unit, and the vehicle components, and thereby monitoring an operating status of at least one of the electrical displacement control, the engine control unit, and the vehicle components; and
   based at least in part on the selected engine speed control mode and the received data inputs, communicating engine speed commands, via the engine speed control module, to at least one of the electrical displacement control and the engine control unit for automatically controlling at least one of a rotational speed of the engine and a terrestrial speed of the vehicle based at least in part on engine speed control parameter of the selected engine speed control mode.

2. The method of claim 1, wherein the plurality of engine speed control modes comprises a Creep Mode, and when in the Creep Mode automatically controlling comprises:
   disabling a manual throttle control mechanism of the vehicle; and
   operating the engine at a substantially constant speed, maintaining a substantially constant terrestrial speed of the vehicle.

3. The method of claim 1, wherein the plurality of engine speed control modes comprises a Creep Mode, and when in the Creep Mode:
receiving the data inputs comprises receiving a throttle input from a manual throttle control mechanism of the vehicle; and
automatically controlling comprises:
operating the engine at a substantially constant speed corresponding to throttle input from the throttle control mechanism; and
maintaining a substantially constant terrestrial speed of the vehicle.

4. The method of claim 1, wherein the plurality of engine speed control modes comprises an Automatic Control Mode, and when in the Automatic Control Mode:
receiving the data inputs comprises:
receiving a maximum throttle input from a manual throttle control mechanism of the vehicle; and
receiving, in real time, inputs from at least one of the vehicle components; and
automatically controlling comprises:
determining an optimal engine speed based at least in part on the real time inputs;
regularly adjusting the engine speed based at least in part on the received real time inputs to achieve the determined optimal engine speed;
limiting the engine speed based at least in part on the maximum throttle input; and
adjusting the terrestrial speed of the vehicle to achieve the determined optimal engine speed.

5. The method of claim 1, wherein the plurality of engine speed control modes comprises a Service Mode, and when in the Service Mode automatically controlling comprises operating the engine at a substantially constant speed.

6. The method of claim 1, wherein the plurality of engine speed control modes comprises a Garage Mode, and when in the Garage Mode automatically controlling comprises:
operating the engine at a substantially constant speed, and
maintaining a substantially constant terrestrial speed of the vehicle, and
the method further comprises:
disabling, via the engine speed control module, a cutting unit of the vehicle.

7. The method of claim 1, wherein the plurality of engine speed control modes comprises an Adaptive Control Mode, and when in the Adaptive Control Mode:
receiving the data inputs comprises receiving, in real time, inputs from the engine control unit and at least one of the vehicle components, and
automatically controlling comprises:
determining a target engine speed based at least in part on the real time inputs;
regularly incrementally adjusting the engine speed based at least in part on the real time inputs to achieve the determined optimal engine speed.

8. The method of claim 7, wherein automatically controlling further comprises adjusting the terrestrial speed of the vehicle to achieve the determined optimal engine speed.

9. The method of claim 1, wherein the plurality of engine speed control modes comprises an Auto-Adjust Mode, and when in the Auto-Adjust Mode:
receiving the data inputs comprises at least one of:
receiving a maximum throttle input from a manual throttle control mechanism of the vehicle; and
receiving, in real time, inputs from at least one of the vehicle components; and
automatically controlling comprises at least one of:
determining an optimal engine speed based at least in part on the real time inputs;
regularly adjusting the engine speed based at least in part on the received real time inputs to achieve the determined optimal engine speed;
limiting the engine speed based at least in part on the maximum throttle input;
adjusting the terrestrial speed of the vehicle to achieve the determined optimal engine speed;
determining a target engine speed based at least in part on the real time inputs;
regularly incrementally adjusting the engine speed based at least in part on the real time inputs to achieve the determined target engine speed.

10. A method for automatically controlling an engine of a turf-care vehicle, wherein the turf-care vehicle comprises:
an internal combustion engine structured and operable to provide motive force to the vehicle;
an electrical displacement control structured and operable to control an amount of torque output by a transmission of the vehicle for controlling a terrestrial speed of the vehicle;
an engine control unit structured and operable to control a rotational speed of the engine; and
an engine speed control module structured and operable to:
receive data inputs from the electrical displacement control, the engine control unit, and a plurality vehicle components;
execute engine speed command software utilizing the data inputs; and
via execution of the engine speed command software, output commands to at least one of the electrical displacement control and the engine control unit to selectively implement one of an engine speed control Fixed Low Speed Mode, an engine speed control Auto-Adjust Mode, and an engine speed control Fixed Engine RPM Mode,
wherein said method comprising;
receiving, at the engine speed control module, a mode selection input from an engine speed control mode selection device of the vehicle, the mode selection input indicative of which one of the Fixed Low Speed, Auto-Adjust, and Fixed Engine RPM Modes is to be implemented by the engine speed control module;
receiving, at the engine speed control module, data inputs from at least one of the electrical displacement control, the engine control unit, and the vehicle components, and thereby monitoring an operating status of at least one of the electrical displacement control, the engine control unit, and the vehicle components; and
based at least in part on the selected engine speed control mode and the received data inputs, communicating engine speed commands, via the engine speed control module, to at least one of the electrical displacement control and the engine control unit for automatically controlling at least one of a rotational speed of the engine and a terrestrial speed of the vehicle based on engine speed control parameter of the selected engine speed control mode.

11. The method of claim 10, wherein when in the Auto-Adjust Mode:
receiving the data inputs comprises at least one of:
receiving a maximum throttle input from a manual throttle control mechanism of the vehicle; and
receiving, in real time, inputs from at least one of the vehicle components; and automatically controlling comprises at least one of:
   setting the engine speed to fixed idle speed value when the engine speed control module receives no inputs from an accelerator pedal of the vehicle;
   regularly adjusting the engine speed based at least in part on the received real time inputs to achieve a determined optimal engine speed;
   limiting the engine speed based at least in part on the maximum throttle input; and
   regularly incrementally adjusting the engine speed based at least in part on the real time inputs to achieve a determined target engine speed.

12. The method of claim 11, further comprising adjusting the terrestrial speed of the vehicle to decrease engine speed when, as a result of the regular incremental adjusting of the engine speed to achieve the determined target engine speed, the engine speed reaches a determined maximum threshold.

* * * * *